(No Model.)

J. C. RICHARDSON.
LOCK NUT AND METHOD OF MAKING SAME.

No. 550,898. Patented Dec. 3, 1895.

Witnesses
Chas. W. Parker.
Jos. H. Milans.

Inventor,
Julius C. Richardson
by J. S. Barker
Atty.

UNITED STATES PATENT OFFICE.

JULIUS C. RICHARDSON, OF AUBURN, ASSIGNOR TO EDWARD JAMES SMITH, OF BUFFALO, NEW YORK.

LOCK-NUT AND METHOD OF MAKING SAME.

SPECIFICATION forming part of Letters Patent No. 550,898, dated December 3, 1895.

Application filed March 12, 1895. Serial No. 541,514. (No model.)

*To all whom it may concern:*

Be it known that I, JULIUS CÆSAR RICHARDSON, a citizen of the United States, residing at Auburn, in the county of Cayuga and State of New York, have invented certain new and useful Improvements in Lock-Nuts and Methods of Making the Same; and I do hereby declare the following to be a full, clear, and exact description of the invention, such as will enable others skilled in the art to which it appertains to make and use the same.

My invention relates to lock-nuts of that class in which the thread is distorted—that is to say, wherein the thread, while continuous or practically continuous from end to end or face to face of the nut, is not a true helix throughout its entire extent, but is rather formed of two helixes connected by a distorted portion of the thread. This form of lock-nut may be readily applied to and removed from a screw-threaded bolt; but when applied thereto sufficiently far to cause the distorted portion of the thread to engage with the thread of the bolt great friction results and the nut is held in the place to which it is set with perfect rigidity and security without the co-operation of other means.

My invention consists of a new and improved lock-nut of this character and of a new and improved method of making such a lock-nut.

The accompanying drawings will assist in the understanding of my invention.

Figure 1:
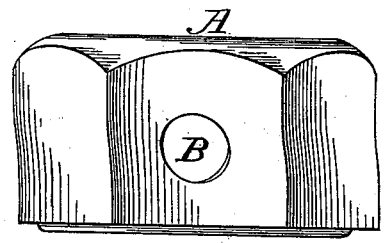
Figure 2:
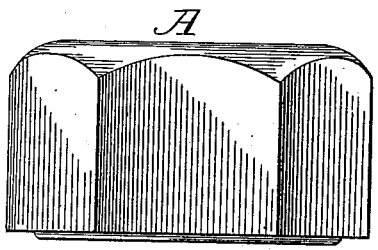
Figure 3:
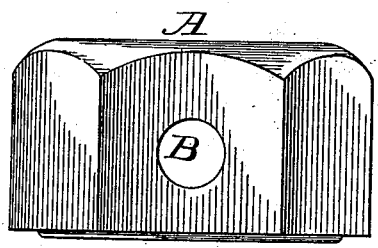
Figure 5:
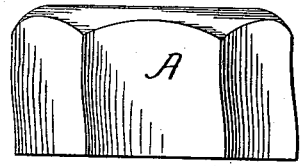
Figure 4:
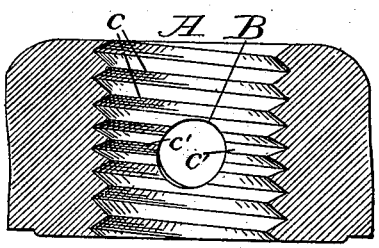
Figure 6:
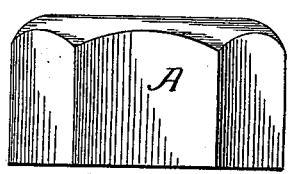
Figure 7:
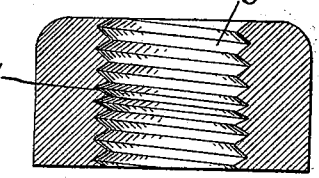

In such drawings, Figure 1 is a side view of a completed lock-nut embodying my invention, the surface-shading in such view being bent to make more apparent to the eye the distortion of the nut. Figs. 2 and 3 represent the nut shown in Fig. 1 in different stages of its manufacture, and Fig. 4 is a sectional view through a completed nut such as shown in Fig. 1. Fig. 5 is a side view of a different form of nut embodying my invention, the surface-shading being distorted, as in Fig. 1, and for the same purpose. Fig. 6 is an elevation of the nut shown in Fig. 5, its sides having been ground or dressed to make them perfect planes. Fig. 7 is a sectional view of the nut shown in Fig. 6.

The nut A may be of any usual or preferred shape, a hexagonal nut being selected for the purpose of illustration. An ordinary solid nut, such as represented in Fig. 2, is first formed in any usual or approved manner, this being the first step in the process of manufacture according to my invention.

In making the nut shown in Figs. 1 and 4 the solid nut is weakened between its upper and lower faces in a plane transverse to the axis of the helical screw-thread, and I prefer that the weakening of the nut should be caused by forming a hole or perforation B through the body of the nut, the hole being arranged centrally and transverse to the axis of the screw-thread. This is the second step in the process of making the nut shown in Fig. 1. The next step in the process of manufacture is the distortion of the thread of the nut, and the second step of the process above described is merely for the purpose of facilitating and rendering more easy this distortion of the thread, and such step may be omitted entirely, as I will presently describe.

The distortion of the nut may be accomplished in the following manner: The weakened nut, which is illustrated in Fig. 3, is placed in a machine or a tool or tools constructed for that purpose, which firmly grasps the nut on either side of its weakened part and is then given by such tool or machine a very slight torsional or transverse twist, the jaws of the machine or tools which grasp the nut, or one of them, being moved very slightly around the axis of the thread of the nut. The result is that the material of the body of the nut yields to the strain applied to it through the tool or machine, the yielding being at its weakened part, so that the thread $c$ of the nut, while continuous from end to end, or practically so, is not a perfect helix, but is distorted at the place $c'$ of the twist in the body of the nut. This distortion of the thread is a changing of the pitch of the thread at the place where the nut yields to the pressure, the thread, under the manipulation above described, having less pitch at the part $c'$ than at its other portions, the convolutions of the thread being here crowded together, as illustrated in Fig. 4.

As above stated, the weakening of the body of the nut is not essential to the carrying out of my invention, and in Figs. 5, 6, and 7 there is illustrated a nut the thread of which is distorted the same as is the thread in the nut shown in Figs. 1 and 4, but wherein the body of the nut is not weakened by a hole B or in any other way. Thus in forming the nut shown in these figures the second step of the above-described process is omitted, the force applied to the nut through the tool or machine which is used to distort it being sufficient to cause the body of the nut to yield, even though it be not weakened. As said, the result is substantially the same, the nut having a continuous thread distorted between its end portions by having its pitch changed.

It will be understood that my invention is not limited to the use of any particular means or the employment of any particular method for distorting the thread so long as the thread is continuous or substantially continuous from end to end and has its thread for a portion of its length distorted or its pitch changed from the normal. The method, however, which I have described is that which I prefer to employ.

When the nut is weakened before the thread is distorted, I prefer that it should be done by means of the perforation B, yet other forms of cutting the nut to weaken it might be employed and still come within the scope of my invention, and this weakening of the body of the nut may be either before or after the cutting of the thread c.

It will be understood that the greater the amount of twist or distortion the greater will be the grasp of the nut upon the bolt; but at the most the amount of movement of one part of the nut relative to another part is extremely slight. It therefore follows that for ordinary nuts no finishing of the faces of the nut is required after the nut has been twisted or otherwise distorted, as the shape of the nut is not sufficiently changed to be apparent to a casual observer; and here it may be remarked that the drawings, Figs. 1, 4, and 5, are somewhat distorted to make easily apparent to the eye the fact that the body of the nut has been twisted or distorted. Where it is desired that the nuts should have a very fine finish, they may be ground or dressed in any suitable way, so as to remove all traces of the distortion and all marring resulting from the jaws of the tools or machine used for such distortion, and a nut thus finished is represented in Figs. 6 and 7. Of course the nut shown in Fig. 1 could be so finished also. The nut which I have described and which constitutes one part of my invention exerts a very strong grip upon the bolt when set in place and remains practically immovable for an indefinite length of time no matter what jar or vibrations it and the bolt to which it is applied may be subject to. The nut may be applied to and removed from the bolt a number of times without impairing its efficiency.

I employ the term "solid nut" in this specification and the claims thereof to distinguish from split or divided nuts, an illustration of which latter class is found in my Patent No. 450,377, of April 14, 1891. In a solid nut the distortion of the body of the nut causes a distortion of the thread without destroying its continuity, whereas when a divided nut is distorted the two parts of the thread in the two parts of the nut are not distorted, but are rather thrown out of line with each other, the two parts of the thread being separated by the split or division of the nut.

I have in the specification and will in the claims following refer to the thread of the nut as being "continuous" or "substantially continuous," notwithstanding the fact that the body of the nut is perforated, and this perforation is shown as cutting the thread. By this expression I mean that the thread is nowhere throughout its length broken or severed entirely across from face to face of the nut, as it is in a split or divided nut, and I use the term "continuous" or "substantially continuous," when applied to the thread, to distinguish from the separated threads in the two parts of a split or divided nut wherein the two threads are severed by the dividing cut between the two parts of the nut.

As has been hereinbefore stated, a hole or perforation made from the side of the nut into the body thereof is the preferred form of weakening the same, and a perforation which extends entirely through the nut, as shown, is a most convenient form of weakening; but the perforation might extend from the opposite sides or faces of the nut only part way to the threaded aperture, in which case it would not cut the thread at all.

I use the term "perforation" in the present case in expressing the idea that the nut is weakened by having a hole formed in the body of the nut from one of its side faces, the shape and extent of that hole being immaterial so long as it weakens the nut at the place where it is desired it should be twisted, and I intend by the use of this term to distinguish from a split or divided nut where the slit between the two parts of the nut enters the body thereof sufficiently far to sever the thread, making in effect two nuts connected along one side or edge.

Having thus described my invention, what I claim, and desire to secure by Letters Patent, is—

1. The herein described method of making lock-nuts, which consists in forming a solid nut, screw-threading the same, and then distorting the thread substantially midway between its ends without destroying the continuity of the thread and without distorting the end portions thereof, substantially as set forth.

2. The herein described method of making lock-nuts, which consists in forming a solid nut, screw-threading the same, and then imparting to the body of the nut a transverse or torsional twist, whereby the thread of the nut has its pitch changed from the normal throughout a portion of its extent.

3. The herein-described method of making lock-nuts, which consists in forming a solid nut, screw-threading the same, then imparting to the body of the nut a transverse torsional twist, whereby the thread of the nut has its pitch changed from the normal throughout a portion of its extent, and then dressing the faces of the nut thereby destroying the appearance of distortion caused by twisting the body of the nut, substantially as set forth.

4. The herein described method of making lock-nuts, which consists in forming a solid nut, perforating the same between its opposite faces on a line substantially transverse to the axis of the thread, and then distorting the nut slightly at the place where it is weakened, substantially as set forth.

5. The herein-described lock-nut, which consists of a solid nut having a continuous thread, the nut being twisted near its middle portion whereby the thread in the part of the nut which is twisted has its pitch reduced and its convolutions brought closer together than the normal, substantially as set forth.

6. The herein described lock-nut, which consists of a solid nut having a substantially continuous thread from face to face and having a weakened portion between its opposite faces, and the nut being distorted at the weakened portion, substantially as set forth.

7. The herein described lock-nut, which consists of a solid nut having a hole through it substantially transverse to the axis of the thread, the thread of the nut being distorted in the plane of the said hole, substantially as set forth.

8. The herein described solid lock-nut having a hole formed through its body substantially transverse to the axis of its thread, the material of which the nut is composed being slightly twisted at the place where the nut is perforated, whereby the thread of the nut is distorted, substantially as set forth.

In testimony whereof I affix my signature in presence of two witnesses.

JULIUS C. RICHARDSON.

Witnesses:
JACOB F. SCHMIDT,
JOHN AUCHINVALE.